United States Patent [19]

De Boodt et al.

[11] Patent Number: 4,494,975

[45] Date of Patent: Jan. 22, 1985

[54] COMPOSING COMPOSITIONS

[75] Inventors: Marcel F. L. P. De Boodt, Gent; Omer F. Verdonck, Oostakker both of Belgium

[73] Assignee: Labofina, S.A., Brussels, Belgium

[21] Appl. No.: 446,291

[22] Filed: Dec. 2, 1982

[30] Foreign Application Priority Data

Oct. 6, 1981 [DE] Fed. Rep. of Germany ....... 3139756

[51] Int. Cl.³ .............................................. C05F 9/04
[52] U.S. Cl. .......................................... 71/25; 71/9; 71/10; 71/12; 71/14; 71/15; 71/23; 71/24; 210/605; 210/610; 210/620; 210/630
[58] Field of Search .................... 71/9, 10, 25, 12, 14, 71/15, 23, 24; 210/605, 610, 620, 630

[56] References Cited

U.S. PATENT DOCUMENTS 3,933,627  1/1976  Fusey ................................. 210/610
3,939,068  2/1976  Wendt et al. ...................... 210/605

Primary Examiner—Arthur P. Demers
Attorney, Agent, or Firm—Michael J. Caddell

[57] ABSTRACT

A process is disclosed for producing compost and composting compositions having a high nitrogen content and being particularly advantageous for use as fertilizers, said process utilizing petroleum sludge and an organic biomass which preferably contains wood industry residue and organic waste products.

20 Claims, No Drawings
{% endraw %}

COMPOSING COMPOSITIONS

BACKGROUND OF THE INVENTION

The present invention relates to new compositions capable of being composted.

Composts are prepared by a process (called "composting") which is a biological decomposition and stabilization of putrescible organic substrates, more particularly wastes. This process is now used on an industrial scale; it requires low investments and is effective in converting organic wastes to valuable products which can be used for fertilizing purposes and also as a mulch to provide temporary protection of a soil surface against erosion by wind or water.

Since waste having a moisture level less than about 50-60 wt % is more valuable for the production of energy (e.g. by incineration, pyrolysis or the like), organic wastes which are available for composting generally have a high water content. However, problems are often encountered in managing these materials since the presence of large amounts of water may reduce composting temperatures, resulting in inefficient operation and difficulties in composting.

It is a primary purpose of this invention to provide composting compositions from wastes which may have a high moisture level. It is also an object of this invention to provide compositions which are easily converted to composts having a high nutrient content.

According to the present invention, the composting compositions contain essentially:

(a) 95 to 75 wt % of a biomass consisting in particles of residues of the wood industry optionally in admixture with organic wastes, and (b) 5 to 25 wt % of petroleum sludge.

It has been found that the incorporation of petroleum sludge into the biomass improves the microbiological activity of the mixture and increases the nitrate content of the compost. The petroleum sludges which settle on the bottom of a crude petroleum oil tank or a heavy oil tank in refineries do not need to be previously dewatered. In fact, sludges wherein the water content may reach about 70 wt. % may be incorporated in the composting compositions.

The microbiological activity of these compositions is improved when the amount of petroleum sludge is even as low as 5 wt %. On the other hand, the oligoelements content of the final composts prepared from compositions containing more than 30 wt % petroleum sludge may exceed the maximum amounts specified in FAO regulations. Composting compositions containing from 5 to about 25% petroleum sludges are preferably used. In some cases, and more particularly when the water content of the composting composition is high, it may be advantageous to use an amount of petroleum sludge which does not exceed about 15 wt %.

According to the present invention, the petroleum sludges are incorporated in a biomass consisting in residues of the wood industry, optionally in admixture with organic wastes generally used for producing composts. It has been found that the residues of the wood industry and more particularly sawdust, wood chips, particles of tree barks, tree trimmings and the like, promote the biological decomposition of the composting mixture. They provide structural support and improve the aeration of the mixture.

The biomass may also contain other organic wastes, such as sludges from municipal and industrial wastewater treatment, animal manures and/or wastes from industrial processes, e.g. from the textile industry, the food industry, and the pulp and paper industry. The selection of the waste depends upon its availability and its price, since the waste has to be collected and transported to the composting installation.

When the biomass contains such organic wastes, the amount of residues of the wood industry in this biomass generally comprises between about 25 and about 65%, based on the weight of biomass.

The above mentioned and other features of this invention will become more apparent by reference to the following description of the preferred embodiments.

DESCRIPTION OF THE PREFERRED EMBODIMENTS

The interest in composting results from the possibility of converting sludges and other organic wastes into soil-conditioning agents and fertilizers. Composting is a biological process carried out under conditions of moisture and aeration which allow decomposition of the substrate and evolution of heat.

It has been found that the incorporation of petroleum sludges into the composting material improves the biological process, as shown by several factors, such as temperature elevation and oxygen consumption.

In the following experiments, varying amounts of petroleum sludge were blended with biomasses comprising tree barks or mixtures of tree barks with organic wastes, such as chicken manure and sludge from wastewater treatment. Some average characteristics of these preliminary materials are summarized in Table 1.

TABLE 1

|  | Petroleum sludge | Tree barks | Sludge from wastewater treatment | Chicken manure |
|---|---|---|---|---|
| Volatile matter at 105° C. (or moisture) (wt %) | 68.8 | 61.3 | 66.5 | 64.9 |
| Volatile matter at 900° C. (wt %) | 61.9 | 93.9 | 58.7 | 67.0 |
| CaCO$_3$ (wt %) | 8.6 | — | — | 9.3 |
| pH | 7.6 | 5.1 | 6.8 | 7.5 |
| Electrical conductivity: uMho in a 1/25 extract | 960 | 490 | 195 | 1860 |

In a first series of tests, tree barks in admixture with varying amounts of petroleum sludge were composted. The results given in Table 2 clearly show the influence of this sludge on the composting process.

TABLE 2

|  | Temperature (°C.) during Composting | | O$_2$ consumption (*) after: | |
|---|---|---|---|---|
|  | Mean | Maximum | 84 hr | 168 hrs |
| tree barks | 23.8 | 44 | 62 | 130 |
| id. + 5 wt % PS | 35.2 | 55 | 87 | 160 |
| id. + 10 wt % PS | 37.9 | 60 | 93 | 160 |
| id. + 20 wt % PS |  |  | 115 | 180 |

(PS = Petroleum sludge)
(*) mg O$_2$ per g based on dried matter.

In a second series of tests, the following composting mixtures were used (% are weight percentages).

|   | Sludge from wastewater treatment | Petroleum sludge |
|---|---|---|
| A | 50 | 50 | — |
| B | 47.5 | 47.5 | 5 |
| C | 45 | 45 | 10 |
| D | 40 | 40 | 20 |

The incorporation of petroleum sludge improves the composting procedure indicated by the improved $O_2$ consumption (in mg per g on dried matter), as shown in the figures in the following Table 3:

TABLE 3

| | $O_2$ consumption after: | |
|---|---|---|
| Composting mixture | 84 hrs | 168 hrs |
| A | 65 | 142 |
| B | 87 | 160 |
| C | 95 | 162 |
| D | 115 | 185 |

Another advantage resulting from the incorporation of petroleum sludge into the composting material is the increase of nitrogen in the compost. The higher the amount of added petroleum sludge, the higher the percentage of nitrogen, (more particularly nitrates), in the final compost. The following Table 4 gives the respective amounts (before and after composting) of:
total nitrogen or N : in weight % of compost
ammoniacal nitrogen or $NH_4-N$: in mg per 100 g of air-dried matter

TABLE 4

| | N | | $NH_4-N$ | | $NO_3-N$ | |
|---|---|---|---|---|---|---|
| Composting mixture | before | after | before | after | before | after |
| A | 1.32 | 1.41 | 140 | 225 | 1.0 | 1.2 |
| B | 1.46 | 1.52 | 134 | 275 | 4.5 | 14.0 |
| D | 1.47 | 1.50 | 94 | 235 | 13.5 | 70.0 |

Similar runs were carried out with the following composting compositions (weight percentages)
E: 50% tree barks+50% chicken manure
F: 45% tree barks+50% chicken manure+5% petroleum sludge.

The percentages of $NH_4-N$ and $NO_3-N$ in the mixtures are given in Table 5.

TABLE 5

| | $NH_4-N$ | | $NH_3-N$ | |
|---|---|---|---|---|
| Composting material | before composting | after composting | before composting | after composting |
| E | 230 | 173 | 14.0 | 3.3 |
| F | 205 | 213 | 22.2 | 48.8 |

The results clearly show that the biological procedure is more active and efficient when a petroleum sludge is added to composting materials.

The final composts are particularly useful for fertilizing purposes since they release nitrogen slowly. Other nutrients, such as salts of magnesium and potassium or phosphor-containing compounds may be added to these composts in order to improve their fertilizing action. Tests carried out to investigate for carcinogenic compounds have shown the composts were free from these compounds; polycyclic aromatic hydrocarbons, compounds containing phenolic groups and other noxious compounds having been biologically decomposed during the composting procedure.

The compositions of the present invention may be decomposed by aerobic or anaerobic composting. One end product of anaerobic decomposition is methane, and the recovery of this product may improve the economics of the composting procedure, but an anaerobic system can be subject to nuisance problems, such as odors. For these reasons, the composting of the compositions of this invention is advantageously performed first in the absence of air and then under aerobic conditions.

The embodiments of the invention in which an exclusive property or privilege is claimed are defined as follows:

1. A composting composition comprising a mixture of biomass and a petroleum sludge.

2. The composting composition of claim 1 wherein said biomass comprises wood industry residue particles.

3. The composting composition of claim 1 wherein said biomass comprises wood industry residue particles and organic waste products.

4. The composting composition of claim 1, wherein said biomass comprises from about 75 to about 95 weight percent of said composition, and said petroleum sludge comprises from about 25 to about 5 weight percent of said composition.

5. The composting composition of claim 3 wherein said biomass comprises about 25 to about 65 weight percent wood residue and about 75 to about 35 weight percent organic waste.

6. The composting composition of claim 3 wherein said biomass comprises about 25 to about 65 weight percent wood residue, and about 75 to about 35 weight percent of an organic waste selected from the group consisting of municipal wastewater sludge, industrial wastewater sludge, animal manure, food industry waste, textile industry waste, and pulp and paper industry waste.

7. The composting composition of claim 3 comprising from about 95 to about 80 weight percent tree bark waste, and from about 5 to about 20 weight percent petroleum sludge.

8. The composting composition of claim 3 comprising from about 40 to about 47.5 weight percent tree bark waste, from about 40 to about 47.5 weight percent wastewater treatment sludge, and from about 20 to about 5 weight percent petroleum sludge.

9. The composting composition of claim 3 comprising about 45 weight percent tree bark waste, about 50 weight percent animal manure, and about 5 weight percent petroleum sludge.

10. A compost comprising an aerobic decomposition of a mixture of a biomass and a petroleum sludge.

11. The compost of claim 10 wherein at least a portion of said compost has been subjected to aerobic and anaerobic decomposition.

12. The compost of claim 10 wherein said biomass comprises wood industry residue and an organic waste selected from the group of petroleum sludge, municipal wastewater sludge, industrial wastewater sludge, animal manure, food industry waste, and paper and pulp industry waste.

13. A process for producing compost; said process comprising:
   adding to a biomass a petroleum sludge; and,
   decomposing said biomass-petroleum sludge mixture to form compost.

14. The process of claim 13 wherein said decomposition step comprises anaerobic decomposition.

15. The process of claim 13 wherein said decomposition step comprises aerobic decomposition.

16. The process of claim 13 wherein said decomposition step further comprises the steps of anaerobic decomposition followed by aerobic decomposition.

17. The process of claim 14 further comprising the step of forming said biomass by mixing wastewater sludge with wood industry residue.

18. The process of claim 14 further comprising the step of forming said biomass from a mixture of wood industry residue and an organic waste material selected from the group consisting of municipal wastewater sludge, animal manure, food industry waste, textile industry waste, pulp waste, and paper industry waste.

19. The process of claim 14 further comprising the step of forming said composition from a mixture of from about 75 to about 95 weight percent biomass, and from about 25 to about 5 weight percent petroleum sludge.

20. The process of claim 19 wherein said biomass comprises from about 25 to about 65 weight percent wood residue and from about 75 to about 35 weight percent organic waste.

* * * * *